3,326,051
STATIC BALANCING MACHINE
James C. Bageman, Pasadena, Vick G. Bonessa, Arcadia, and Norman M. Roe, Granada Hills, Calif., assignors to The Bada Company, Pasadena, Calif., a corporation of California
Filed Mar. 12, 1964, Ser. No. 351,478
7 Claims. (Cl. 73—484)

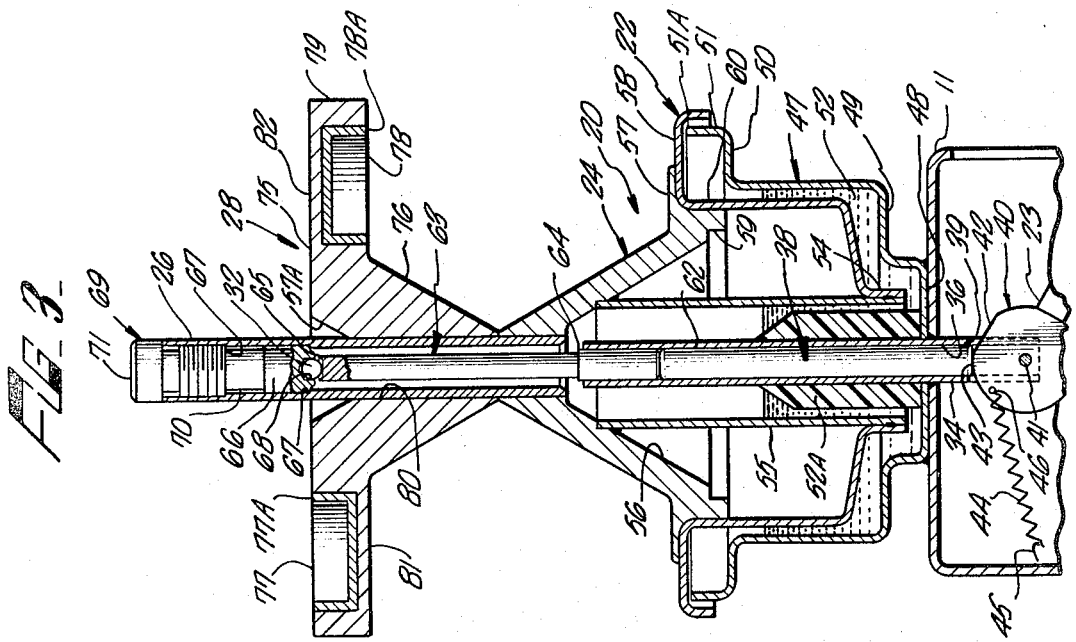

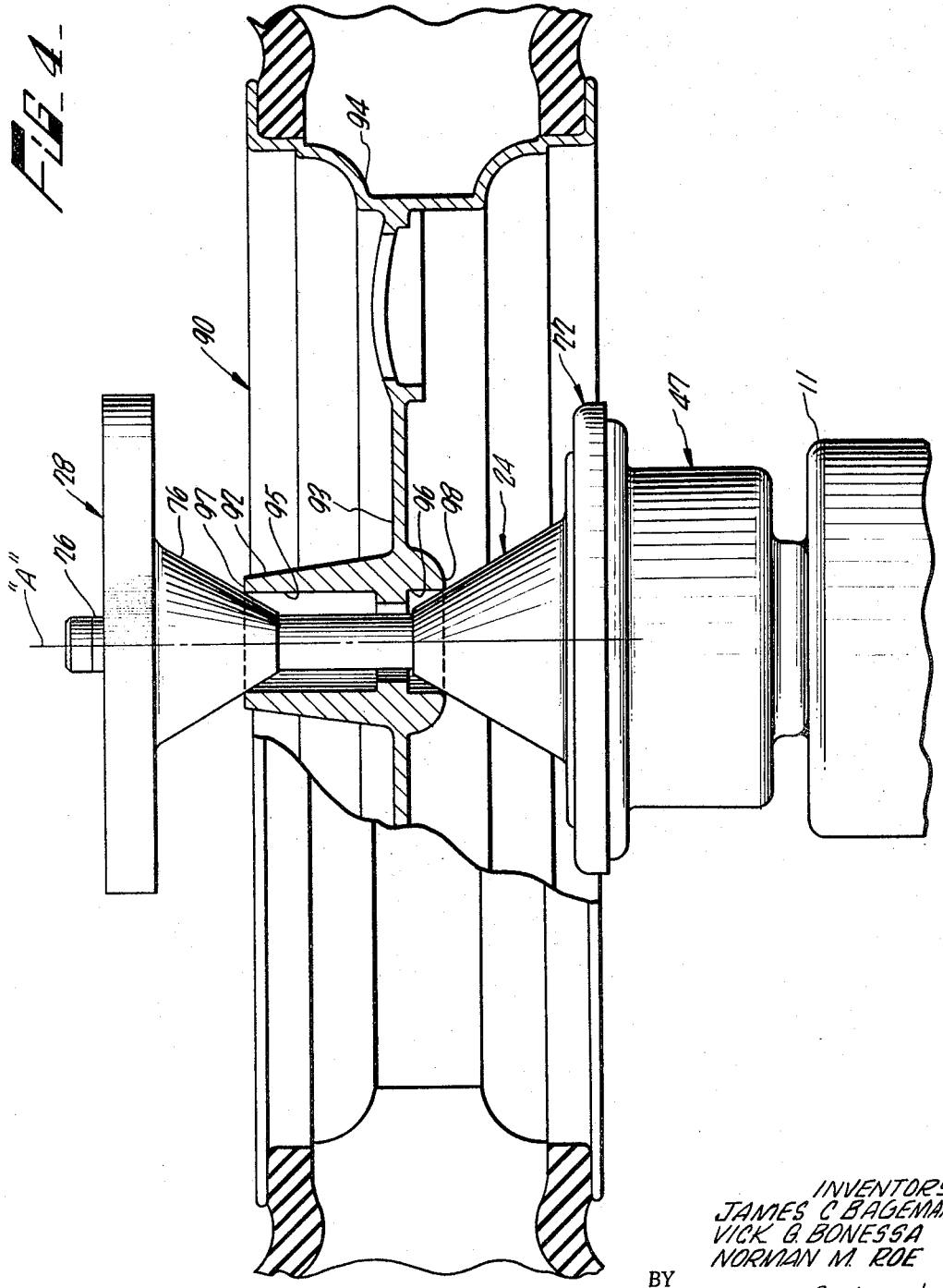

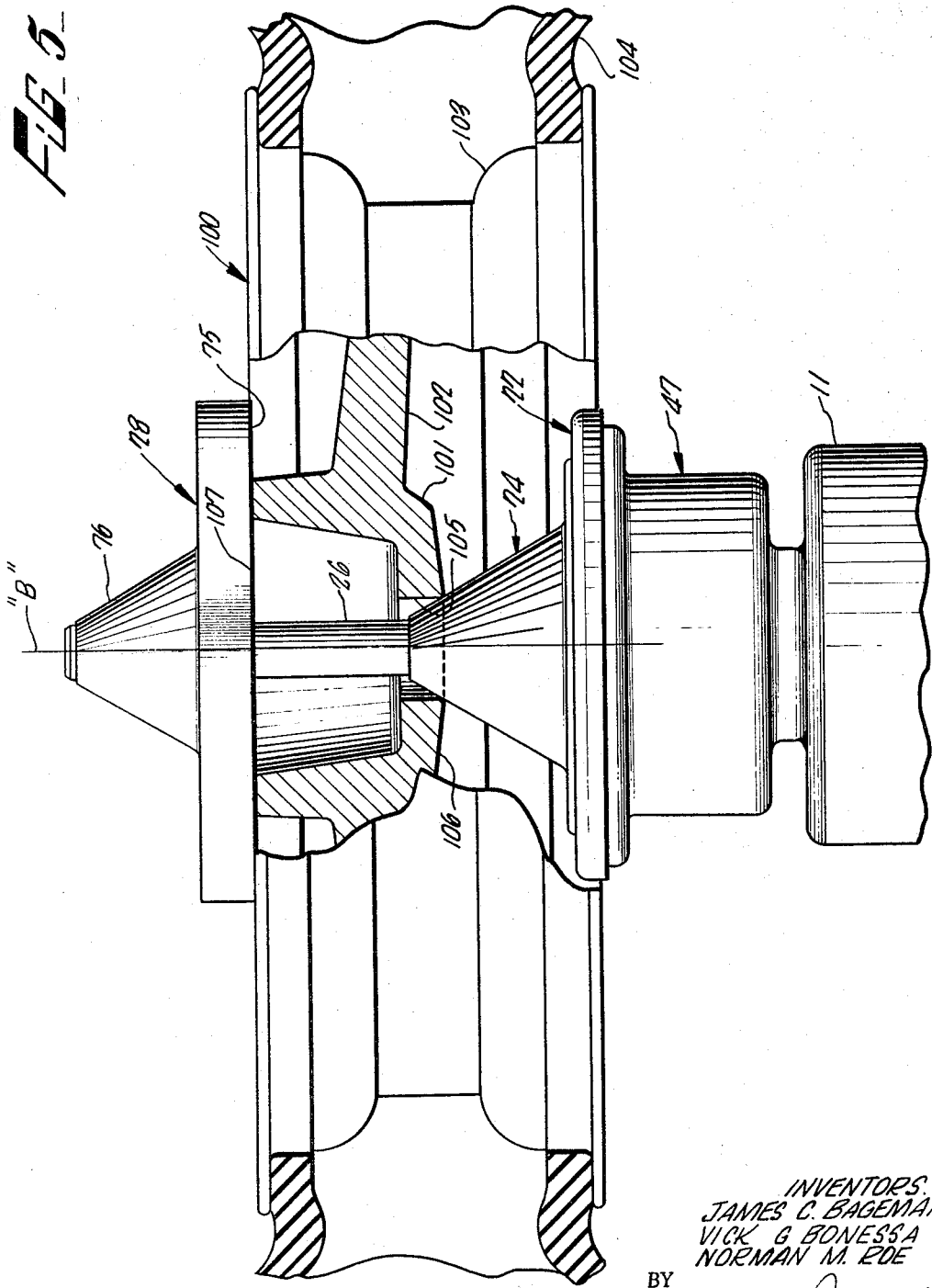

This invention relates to static wheel balancers for vehicles.

Static wheel balancers have in the past performed the function of locating heavy spots on the wheels used for automobiles, trucks, and the like, by using a supporting assembly universally tiltable on a pivot point. A weight or combination of balancing weights is located on the wheel to balance the same as indicated by the balancer. The great majority of static balancers have wheel holding heads which fit wheels from the majority of motor vehicles such as automobiles and trucks. The conventional vehicle wheel is characterized by a tire holding rim and a web which is a heavy sheet metal flange having a flat portion which may be bolted to a drum that is one part of the braking system. For wheels which do not fit the conventional wheel holding head, adapters are used to bridge the gap between the wheel flange and the holding head. All other wheels which have configurations of such a shape which may not be supported on the wheel holding head cannot be balanced by such static balancers.

In racing cars, the need for adequately balanced wheels is obvious, and the static imbalance of a wheel causes the wheel and tire to "hop" at elevated speeds, which is a deterrent to maximum performance in a race or speed trial. In many road racing machines and high speed race cars, any imbalance to the wheels and tires severely limits the performance of the vehicle, and at maximum speeds could endanger the life of the driver and of the drivers in competing racing machines.

The more recent road racing and speed trial type vehicles include low weight wheels to help limit the weight in a racing machine's unsprung mass. Magnesium has been especially favored by racing enthusiasts, because of its low weight and high strength, and has been increasingly used by the entire racing fraternity.

Long distance racing at high speeds accelerates tire wear, requiring ultra fast pits stops for new tires in addition to other rapid servicing. The "knock off" hub, rather than a series of lug bolts, helps in the rapid mounting and dismounting of the wheel and tire during races. This type of wheel is connected to a freely rotating stub shaft rather than being mounted to a flat plate, as in the more conventional automotive vehicles. A bearing or bearings is sometimes included in the construction of racing wheels, and often the racing machine designer and manufacturer frequently design and build their own wheel to the particular type of suspension and space allotted to the wheel. Therefore, there are numerous shapes and sizes of racing car wheels, each generally different from any other wheel and quite different from the conventional automobile.

While it was previously recognized that static balancing is a necessity for the best performance of racing machines, static balancers have not been available to racing car enthusiasts, requiring them to use their own ingenuity to balance their wheels, thus requiring them in essence to design their own balancing machine for each particular type of racing wheels.

In accordance with the invention, we have recognized the problems in attempting to provide a balancing machine which will accept many different varieties of wheels, especially those which are used for racing machines. Our invention is directed to a static balancing machine which is flexible enough to be used on many types and shapes of wheels and thereby has advantages in this flexibility. One feature of our invention is a balancing head which can accept a wheel providing spaces for bearings. Another feature of our invention is a balancing head which accepts wheels either with or without a flat mounting flange.

Our invention contemplates a balancer having a stationary frame with an upstanding pedestal mounted thereon. A pivot engages and is supported by the pedestal. A hollow post extends over the pedestal and is supported by the pivot. A wheel supporting pivot head is mounted to the lower extremity of the post and extends around the pedestal. A centering and clamping plate is slidably mounted in the post and serves to help center a wheel upon the pivot head.

Another feature of my invention is directed to a balancing head which may be inserted within conventional balancing machines, thus tending to make it universally acceptable by the market.

Other features and advantages of my invention will become apparent in the following detailed specification and drawings in which:

FIG. 1 is an elevation view of a balancing machine embodying the present invention;

FIG. 2 is a top view of the balancing head constructed according to the present invention;

FIG. 3 is a fragmentary view taken on line 3—3 of FIG. 2;

FIG. 4 is a partial cross sectional view of the balancing head according to the present invention having mounted thereon one variety of wheel, which may be balanced on the head; and FIG. 5 is a partial cross sectional view of the balancing head constructed according to the present invention having another type of wheel mounted thereon for balancing.

Referring to FIG. 1, a wheel balancer 10 includes an upright hollow cylindrical chamber 11 resting on legs 12 equipped with leveling screws 14, which may be rotated within the legs to balance the machine. A movable wheel supporting head 20 is vertically movable by the pivotable handle 22.

Referring to FIGS. 1, 2, and 3, the pivot head 20 includes a base 22 having a truncated cone 24 projecting therefrom, which supports an upstanding post 26. The head further includes a centering plate 28 slidably mounted upon the post 26, and normally abutting the truncated cone 24. A pedestal 38 normally supports the entire pivot head 20 abutting the pivot sphere 32, which is a part of the upstanding post 26.

The head 20 is centered around a cylindrical support sleeve 34, which has a longitudinal cylindrical bore 36. The support sleeve is immovably fixed and mounted upon the cylindrical housing 11, which is shown schematically and in practice would be suitably reinforced and braced to carry the loads imposed. The bore 36 of the support sleeve 34 slidably carries a cylindrical pedestal 38. The lower end of the support sleeve has a bifurcation 39, which receives a cam 40 pivotally mounted upon a diametrical cam journal 41. The cam journal is oriented at right angles to the bifurcation 39 and is carried by the bifurcated ends of the support sleeve 34.

The cam 40 is substantially a cylindrical disc having a pair of flats 42 and 43. The cam 40 has a handle 23 fixedly mounted thereon adapted to rotate the cam about the cam journal in a manner that when the handle is moved downwardly, the cam is rotated clockwise to dispose the flat 43 of the cam within the bore of the support sleeve, and when the handle 23 is moved upwardly, the flat 42 of the cam is disposed within the bore of the support sleeve. When the flat 42 is in the position substantially parallel with the head 20, the pedestal 38 is in its lower position, and when the flat 43 is disposed within the bore, the pedestal is in its raised position. This perpendicular distance of the flat 42 from the center of rotation of the cam is less than the perpendicular distance of the flat 43. The difference in spacing the two flats determines the net amount of upward displacement of the pedestal when it is moved from the lower position to the raised position. A tension spring 44 is connected to the base 11 by a bracket 45 and to the cam 40 by the perforation 46, in which a hook on the spring registers. The intersection of the flats 42 and 43 is located a greater distance from the center of rotation of the cam than either the flats, so that the counter clockwise rotation of the cam 40 places the pedestal 38 in its lower position will necessitate first lifting the pedestal and the load it pivotally carries. The tension of the spring 44 when the flat 43 is within the bore of the support sleeve 34, and the radial location of the perforation 46 from the center of the cam 40 are determined in accordance with conventional design procedures so that the rotation of the cam 40 is sufficient to lift the pedestal 38 upon the intersection of the flats 42 and 43 rather than on the flat 43. Consequently, when a wheel or other load is removed from the cone 24, the cam 40 is rotated automatically by the spring 44 in a counter clockwise direction until the flat 42 is disposed within the bore of the support sleeve 34, thus lowering the pedestal 38. As a result the normal unloaded position of the pedestal 38 is in its lower position. If desired, the spring 44 may have a sufficient initial bias to counteract the weight of the handle 23 so as to insure that the bearing engagement of the pedestal 38 and the flat 42 is maintained until an outside force is applied to the handle 23 to rotate the cam 40 in a clockwise direction, and thus raise the pedestal 38.

A bowl 47 is rigidly mounted upon the cylindrical base 11, and has a lower substantially horizontal planar portion 48, which bears upon the base 11, and upwardly and outwardly extends a side skirt 49 which terminates an upwardly extending substantially horizontal portion 50, and an upwardly extending lip 51. The horizontal portion 50 and the lip 51 form a gutter to prevent over flow of a damping liquid 52 disposed within the bowl 47.

An upstanding annular shaped damping sleeve 52A surrounds the support sleeve 34, and is rigidly attached at its lower end to the lower horizontal portion 48 of the bowl 47.

Pivot head base 22 has a downpending vertically disposed lip 54 to which is fixedly attached a length of vertically upstanding cylindrically shaped pipe 55, which is connected at its opposite end within a cavity 56 formed in the cone 24. A combination of the cone 24, base 22, and the pipe 55 fixedly attached to each other form the pivot head 20. The cone 24 includes a horizontally disposed flange 57, which abuts a horizontal portion 58 of the base 22. A downpending rim 59 formed on the lower portion of the cone 24 closely fits a body portion 60 of the base 22.

The pedestal 38 includes a follower 62 and a tappet 63. A lower end 64 of the tappet 63 is slidably received within the support sleeve 34, and is of substantially the same size as the follower 62. A lower end of the follower 62 is adapted to ride on the periphery of the cam 40, and thereby be elevated when it is in contact with the flat 43 of the cam, and to be lowered when in contact with the flat 42. The upper end of the follower 62 is in bearing contact with the lower end 64 of the tappet 63. The tappet 63 is adapted to be slidably removed from the support sleeve 34, and has an upper planar face which extends at substantially right angles to the longitudinal axis of the pedestal 38. The upper end of the tappet 63 carries an external substantially horizontal outwardly extending rib 65, which provides the barrier for the horizontal movement of the pivot head 20 when being supported by the pivot sphere 32.

An insert 66 is slidably received within a bore 67 formed in the upper portion of the post 26 and is retained upon a ledge 67' within the base to limit its downward movement. A centrally disposed counter-bore 68 in the lowermost portion of the insert 66 receives the pivot sphere 32, which is press fitted therein. A bolt 69 is threaded into the upper portion of the post 26 and has an extremity 70, which abuts the insert 66 thereby forcing the insert 66 constantly against the ledge 67' and keeping the pivot sphere 32 constantly at the same horizontal level within the post 26. A head 71 formed on the bolt 69 limits the downward movement of the bolt into the post 26, and prevents the interior of the post 26 from becoming contaminated by foreign matter passing through the upper portion of the post.

The centering plate 28 includes a plane surface 75 on the upper end thereof, and a cone 76 on its opposite end. The centering plate 28 centers or locates a wheel to be balanced coaxially with the axis of the post 26 and the pivot head 20. The plate 28 further clamps or rigidly holds a wheel to be balanced against the pivot head 24. A pair of spirit levels 77 and 78 are disposed on opposite sides of the continuous flange 79, which surrounds the cone 76. The centering plate 28 has a passageway 80 passing therethrough, thus allowing the plate 28 to be slidably mounted upon the post 26. The passageway 80 is positioned at right angles with relation to the surface 75. Each of the spirit levels 77 and 78, respectively, is disposed within a cavity 77A and 78A and is held therein by a cement such as plaster of Paris. Details of the spirit level are given in U.S. Patent No. 2,909,063.

The cone 76 is preferably shaped with the same included angle as the cone 24, and in the most preferred embodiment of the invention, the included angle is 60° which tends to be most useful in centering wheels and tends not to wedge the wheel upon the pivot head, but yet centers the wheel quickly upon installation of the wheel upon the machine.

Recesses 81 and 82 are formed on opposite sides of the respective cavities 77A and 78A, and may be used for an advertising decal or emblem, and aids in the aesthetic appearance of the centering plate.

Referring now to FIG. 4, a wheel 90, having the configuration of a typical racing wheel, includes a centrally located hub 92, a continuous web 93 extending radially outwardly to a tire retaining rim 94. The hub 92 includes a pair of bores 95 and 96, each respectively terminating in a bearing surface 97 and 98, which is disposed at right angles to the longitudinal extent of the respective bores.

Preparatory to the balancing procedure, the wheel 90 is placed upon the cone 24 such that the bore 96 engages the cone. The centering plate 28 is naturally withdrawn from the post 26, while the wheel is placed upon the cone 24. The centering plate is thereafter slidably mounted upon the post 26 until the cone 76 enters the bore 95 and is forced thereon thereby aligning the bores 95 and 98 with the longitudinal axis A of the post 26. Thereafter the wheel is balanced in a manner which is well known in the art and which is set forth in detail in the patent to Bageman et al., 3,055,221.

Referring now to FIG. 5, a wheel 100 has a common configuration of magnesium or aluminum cast wheels used in racing cars. The wheel 100 includes a centrally located hub 101 having an integrally formed web 102 terminating in a conventional rim 103, which retains a tire 104 in a conventional manner. The hub 101 includes a centrally located bore 105, having a spherically shaped end 106, and a flat mounting face 107.

In the installation of the wheel 100 upon the balancing machine, the centering plate 28 is removed, and the wheel is inserted upon the machine such that the bore 105 encircles the post 106 and rests upon the cone 24. The centering plate is slidably mounted upon the post 26 such that the flat surface 75 abuts the flat mounting face 107, thus aligning the bore 105 coaxially with the axis B of the post 26 and also disposes the mounting face 107 at right angles to the same axis. The wheel is then ready to be balanced in a manner well known in the art.

A distinct advantage of the apparatus constructed according to our invention lies in the arrangement as illustrated in FIG. 3 in which the tappet 67 of the pedestal 38 may be removed along with the centering plate 28 and the pivot head 20 from the balancing machine. A more conventional pivot head, which is illustrated in U.S. Patent No. 3,055,221, may be reinstalled without extensive adjustment or extended installation procedures.

We claim:

1. A balance head for a wheel balancing machine including a base and a pedestal extending vertically upwardly from the base, the head comprising a pivot member adapted to engage the pedestal and be supported thereby, a hollow post adapted to be disposed loosely over the pedestal and carrying the pivot member interiorly thereof, a wheel receiving member carried by the post member and including an upwardly tapering conical portion circumferentially of and coaxially of the post member, the post member extending upwardly without diametral enlargement from said conical portion to an upper end spaced from said conical portion, a clamping member having an axial bore therethrough, the bore having a diameter slightly larger than the outer diameter of the post member whereby the clamping member is removably engageable over the upper end of the post member for slidable movement along the post member toward and away from the wheel receiving member, the clamping member defining on a first side thereof a planar surface normal to the elongate extent of the bore and through which the bore opens and defining on an opposite second side thereof a tapering conical projection concentric to and coaxially aligned with the bore whereby the clamping member is reversible on the post member relative to the wheel receiving member for wheel centering and clamping cooperation with the receiving member, the conical projection cooperating with the conical portion when the clamping member is disposed on the post with the planar surface opening upwardly to center and clamp coaxially of the post a wheel supported on the receiving member by said conical projection and said conical portion engaging opposite ends of a central bore through such wheel, the planar surface and the conical portion cooperating when the clamping member is disposed on the post member with the planar surface opening downwardly to center and clamp coaxially of the post a wheel supported on the receiving member by said conical portion engaging in the lower end of a central bore through such wheel and the planar surface engaging the wheel adjacent the upper end of the bore of such wheel, and level indicating means secured to the clamping member for indicating in either relation of the clamping member relative to the wheel receiving member the extent to which and the direction in which the axis of the post is misaligned with an imaginary vertical line through the pivot member.

2. A balance head according to claim 1 wherein the level indicating means comprises a spirit level mounted to each of the first and second sides of the clamping member.

3. A balance head according to claim 1 wherein the clamping member is elongated in a direction transverse to the bore therethrough, the conical projection is located centrally of the clamping member, and the second side of the clamping member laterally of the projection defines a second surface parallel to the first side planar surface.

4. A balance head according to claim 3 wherein the level indicating means comprises a first circular spirit level recessed in the first side of the clamping member adjacent an end of the clamping member and a second circular spirit level recessed in the second side of the clamping member adjacent an end thereof laterally of the projection.

5. A balance head according to claim 1 wherein the taper of the receiving member conical portion is substantially equal to the taper of the clamping member conical projection.

6. A balance head according to claim 5 wherein the included angle of said tapers is about 60 degrees.

7. A balancing head for a balancing machine for use in statically balancing wheels for automotive racing vehicles and the like, the head comprising an upright pedestal mounted on the balancing machine, a hollow post disposed about the pedestal along an upper portion of the pedestal, the post having a circularly cylindrical exterior surface of essentially constant diameter along the length thereof, pivot point means cooperating between the upper end of the pedestal and the post for pivotally supporting the post on the pedestal so that the post extends downwardly of said means along and around the pedestal, a wheel receiving member secured to the lower end of the post including an upwardly extending conical portion disposed concentric to the central axis of said cylindrical surface, a reversible wheel centering and clamping member slidably removably engageable with the post above the receiving member conical portion, the centering and clamping member having a circularly cylindrical bore therethrough communicating opposite effective sides of said member, the bore being sized relative to the diameter of the post exterior surface to provide a tight sliding fit of the centering and clamping member on the post, one of said effective sides defining a planar surface normal to the elongate extent of the bore and the other effective side carrying a conical projection disposed concentric to the bore, and level indicating means responsive to movement of the post for indicating, regardless of whether the clamping member planar surface is disposed toward or away from the wheel receiving member, the extent to which and the direction in which the post axis is misaligned with an imaginary vertical line through the pivot point means thereby to indicate the condition of static balance of a wheel supported on the receiving member, centered relative to the post axis, and held in such relation by the centering and clamping member.

References Cited

UNITED STATES PATENTS

| 2,075,421 | 3/1937 | Bennett | 73—484 |
| 2,674,122 | 4/1954 | Goltra | 73—484 |
| 2,919,582 | 1/1960 | Riedel | 73—484 |
| 3,055,221 | 9/1962 | Bageman et al. | 73—484 |
| 3,159,035 | 12/1964 | Mueller et al. | 73—483 |
| 3,201,997 | 8/1965 | Rosenblum | 73—480 |

FOREIGN PATENTS

| 731,459 | 6/1955 | Great Britain. |
| 368,394 | 2/1939 | Italy. |

RICHARD C. QUEISSER, *Primary Examiner.*

JAMES J. GILL, *Examiner.*